United States Patent [19]
MacConnell et al.

[11] Patent Number: 5,953,871
[45] Date of Patent: Sep. 21, 1999

[54] MODULAR WALL PANEL

[75] Inventors: Neil MacConnell; Donald Hall, both of London; Robert Ruso, Mississauga, all of Canada

[73] Assignee: Design Board Industries Inc, Ontario, Canada

[21] Appl. No.: 09/017,585

[22] Filed: Feb. 3, 1998

[51] Int. Cl.$^6$ .................................................. E04C 2/32
[52] U.S. Cl. .................. 52/220.1; 52/220.7; 52/801.1; 52/586.1; 52/587.1
[58] Field of Search ............................. 52/220.1, 220.7, 52/801.1, 586.1, 587.1, 515, 309.4, 483.1

[56] References Cited

U.S. PATENT DOCUMENTS

| | | | |
|---|---|---|---|
| 2,660,270 | 11/1953 | Jenkins et al. | 52/220.7 X |
| 3,567,842 | 3/1971 | Meyer | 52/220.7 X |
| 3,996,959 | 12/1976 | Caruth | 52/220.7 X |
| 5,081,808 | 1/1992 | Bastian et al. | 52/220.7 |
| 5,249,401 | 10/1993 | Schmid | 52/503 |
| 5,277,005 | 1/1994 | Hellwig et al. | 52/220.7 X |
| 5,444,955 | 8/1995 | Ou | 52/220.7 X |
| 5,487,246 | 1/1996 | Hodges et al. | 52/220.7 X |
| 5,642,593 | 7/1997 | Shieh | 52/220.7 X |
| 5,729,936 | 3/1998 | Maxwell | 52/220.7 X |
| 5,743,052 | 4/1998 | Mayhall et al. | 52/220.7 X |

OTHER PUBLICATIONS

Economec Electro–Medical Equipment Inc. (6 Sheets).
Hill–Rom—The Flatwall (4 Sheets).
Hill–Rom—The Horizon Headwall System (16 Sheets).
Hill–Rom—The Neonatal Horizon (8 Sheets).
Hill–Rom—The Power Column (6 Sheets).
Hill–Rom 950E Power Column (5 Sheets).
Med æes Incorporated Critical Care Columns (4 Sheets).
Med æes Incorporated Closed Critical Care Column (7 Sheets).
Med æes Incorporated—Medical Rail Headwall Patient Service System. Gen..Specifications Mar. 23, 1998 (6 Sheets).
Med æes Incorporated—Vertical Headwall System. Gen. Specifications Mar. 23, 1998 (3 Sheets).
Med æes Incorporated Vertical Headwall System (2 Sheets).
Med æes Incorporated—Vertical Headwall System—Gen. and. Architectual Specifications (7 Sheets).

*Primary Examiner*—Carl D. Friedman
*Assistant Examiner*—Phi Dieu Tran A
*Attorney, Agent, or Firm*—Thomas A. O'Rourke; Wyatt Gerber Meller & O'Rourke

[57] ABSTRACT

A modular wall panel ready for installation in a medical facility, the panel having at least one medical gas conduit positioned therein. The modular wall panel has a pair of opposed side sections and a frame to support each of the side sections. The panel has a pair of longitudinal edge regions, the frame including a generally upright frame portion extending along each of the longitudinal edge regions to form a passage therealong for engagement with an adjacent wall panel. The spacing between the upright frame portions and the spacing between the opposed side sections together define an inner cavity. Preferably, the upright frame portion is U-shaped and at least one generally U-shaped transverse frame portion extends between the longitudinal frame portions and the transverse frame portion includes an aperture therein and a medical gas conduit extends through the cavity and is positioned in the aperture.

15 Claims, 8 Drawing Sheets

MODULAR WALL PANEL

BACKGROUND OF THE INVENTION

1. Field of the Invention

The present invention relates to modular wall systems and more particularly to modular wall systems for medical and other facilities.

2. Description of the Related Art

Modular wall systems have become an important fixture in the design and construction of modern commercial office space. Modular wall systems allow the floor plan to be changed in a relatively easy manner, by simply moving the modular wall system as desired. The concept is based on the notion that the periphery of the space as well as a number of appropriately positioned columns therein support the full weight of the next upper floor. In this manner, the modular wall system need do nothing more than define the floor plan and delineate one office from the other, while providing a mounting location for office shelves, lighting switches, doors and the like.

To date, medical facilities have also benefitted from the versatility of modular wall system construction. However, the medical facility in some cases also requires the use of medical gases such as oxygen, as well as air and vacuum supplies for the treatment of patients or for the operation of patient-treating machines. Traditionally, this has meant that the conduits and valve arrangements used for dispensing such gases have to be manually installed following installation of the wall panel. Though generally satisfactory once installed, these manually installed medical gas units are usually simply discarded when the wall system is moved.

SUMMARY OF THE INVENTION

It is therefore an object of the present invention to provide a novel modular wall panel.

It is another object of the present invention to provide a novel modular wall panel for use in a facility in need of a supply of gases, in a manner that minimizes the manual assembly otherwise needed to install such conduits on the exterior of modular wall panels after their installation.

It is another object of the present invention to provide a method for installing gas conduits in a facility such as a medical facility in a manner that minimizes the manual assembly otherwise needed to install such conduits on the exterior of modular wall panels after their installation.

It is another object of the present invention to provide a modular wall panel whose construction provides a substantial inner utility cavity, in relation to the outer dimensions thereof.

Briefly stated, the invention involves a modular wall panel ready for installation in a medical facility, the panel having at least one medical gas conduit positioned therein.

In another aspect of the present invention, there is provided a modular wall installation for a medical facility comprising a plurality of wall panels, at least one of the wall panels having at least one medical gas conduit integrally formed therein.

In another aspect of the present invention, there is provided a modular wall panel for installation in a medical facility, comprising a pair of opposed outer faces arranged to extend from a point adjacent a ceiling to a point adjacent a floor, said panel further comprising at least one medical gas conduit extending through said panel and confined between said outer faces.

In one embodiment of the present invention, there is provided a modular wall panel having a pair of opposed side sections, frame means to support each of the side sections, the panel having a pair of longitudinal edge regions, the frame including a generally upright frame portion extending along each of the longitudinal edge regions to form a passage therealong for engagement with an adjacent wall panel, wherein the spacing between the upright frame portions and the spacing between the opposed side sections together define an inner cavity. Preferably, the upright frame portion is U-shaped and at least one generally U-shaped transverse frame portion extends between the longitudinal frame portions and the transverse frame portion includes an aperture therein and a medical gas conduit extends through the cavity and is positioned in the aperture.

In yet another aspect of the present invention, there is provided a modular wall installation, comprising a plurality of modular wall panels, a given one of the panels having pair of opposed outer faces arranged to extend from a point adjacent a ceiling to a point adjacent a floor, the given panel further comprising at least one conduit extending through the given panel and confined between the outer faces.

'In still another aspect of the present invention, there is provided a method of equipping a medical facility with medical gasses, comprising the steps of:

providing a number of modular wall panels for installation in the facility;

integrally forming in at least one of the wall panels and prior to installation, at least one medical gas conduit extending through the panel;

installing the modular wall panels; and connecting the at least one medical gas conduit to a medical gas supply.

In yet another aspect of the present invention, there is provided a modular wall installation in a medical facility, comprising a plurality of modular wall panels, a given one of the panels having pair of opposed outer faces arranged to extend from a point adjacent a ceiling to a point adjacent a floor, the given panel further comprising at least one medical gas conduit extending through the given panel and confined between the outer faces.

In one embodiment, the given panel has an upper edge region to be positioned adjacent the ceiling, wherein the conduit extends outwardly from the upper edge region and the outer faces are formed on a pair of opposed side sections separated by a gap therebetween, the conduit positioned in the gap. The given panel also includes a frame means to support each of the side sections. Preferably, the installation has a pair of opposite wall faces, the opposed outer faces of the given panel being substantially coplanar with the opposite wall faces.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 3:
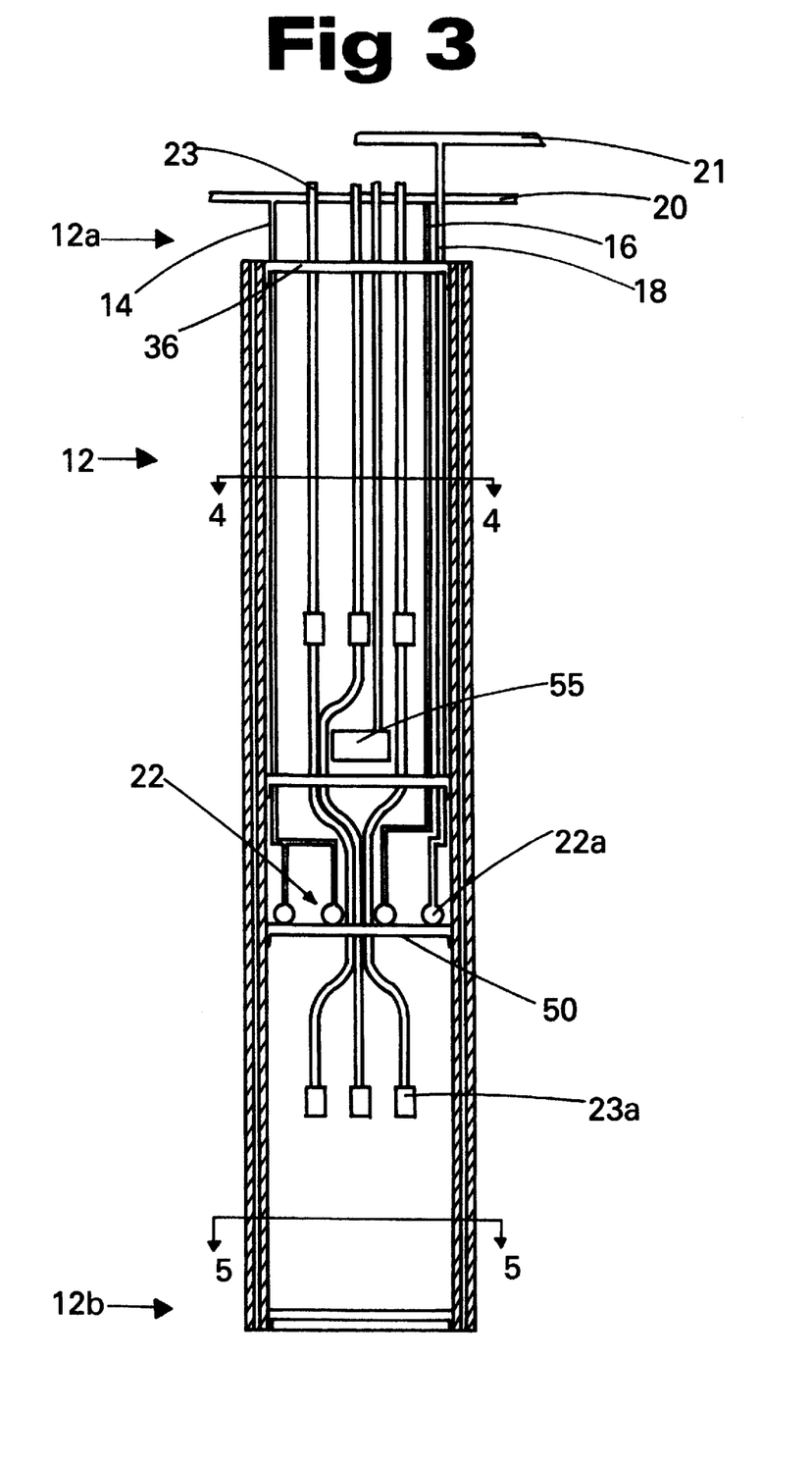
FIG. 3 is a sectional view taken on line 3—3 of FIG. 5.

Referring now to the drawings, there is provided a modular wall panel installation 10 of the type used in a medical facility and which includes within it a number of modular wall panels. One such wall panel is shown at 12 which, as will be described herein below, has a number (for example three) of medical gas conduits positioned therein as shown at 14, 16 and 18 as shown in FIG. 3. Each gas conduit conveys medical gases such as air, purified oxygen, or perhaps a vacuum, between conduit supply lines such as that shown at 20, 21. Access means is provided on one outer face 12c of the panel for accessing the conduits to transfer fluids therebetween, namely in the form of valve means shown generally at 22. The valve means 22 in turn include a number of valve bodies 22a. A number of electrical cables are also provided at 23 to supply power to a number of electrical outlets 23a.

Figure 4:
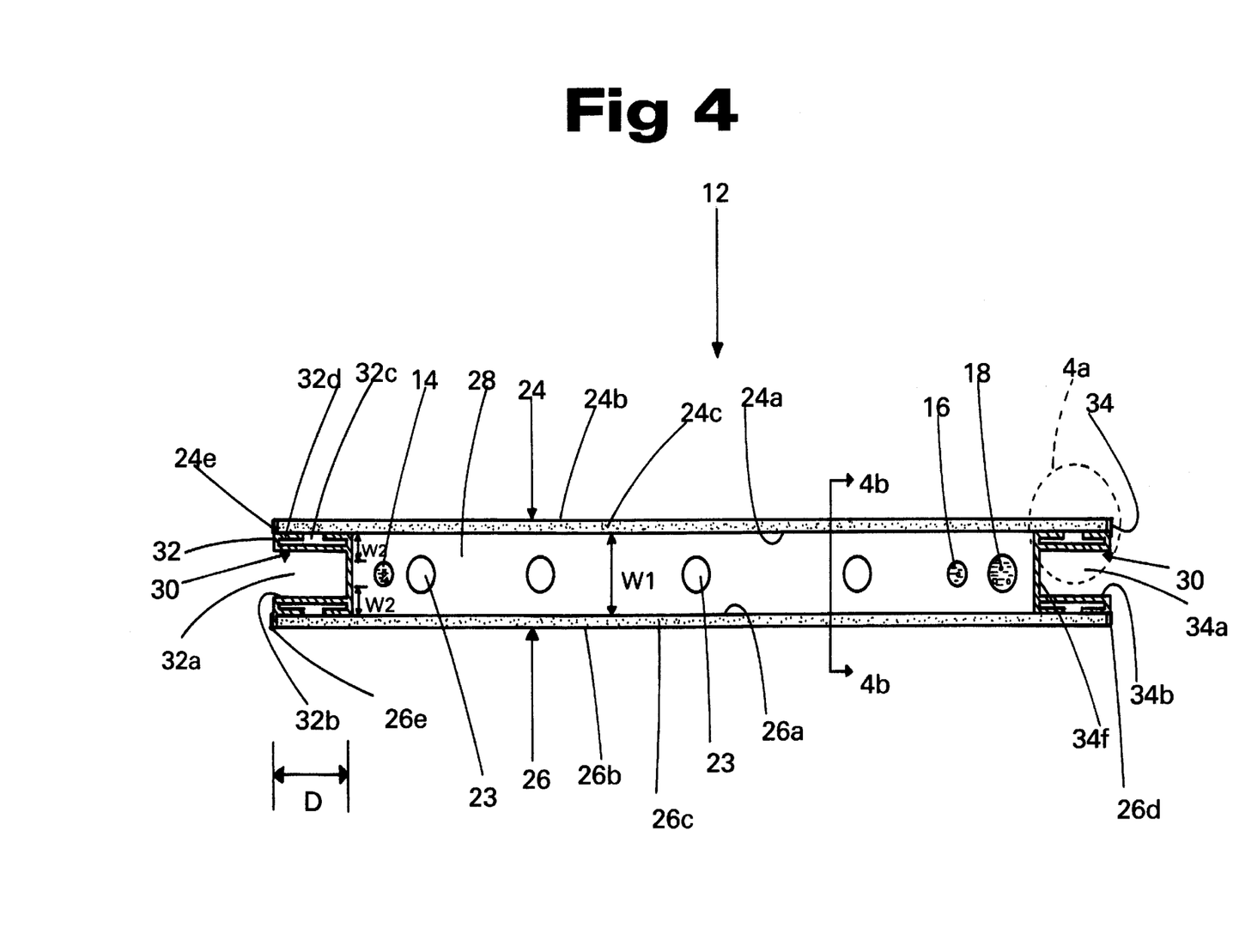
FIG. 4 is a sectional view taken on line 4—4 of FIG. 3.

Referring to FIG. 4, the wall panel 12 includes a pair of side sections 24, 26 separated by a gap or cavity 28 therebetween and which, as will be a described, provides a substantial inner utility cavity, in relation to the outer dimensions of the wall panel. The gap has a width 'w$_2$' and each side section has an inner surface 24a, 26a facing the gap and the conduits extend through the gap without engaging either of the inner surfaces as shown by the dimension 'w$_2$' in order to avoid damage either to the conduits or the side sections as well as to make room for other hardware used in the installation and function of the conduits. The dimension w$_1$ may be for example, in the order of 1.5 inches to 2 inches while the conduits themselves may range from, for example, ¾ to ½ inch. Conveniently, the inner surface on each of the side sections is also substantially planar along the gap, so as not to interfere with the conduits. In other words, the wall panel 12 allows for the rather strict requirements that can be found in some urban or other building codes, which include the spaces between the conduits and the side sections.

Figure 1:
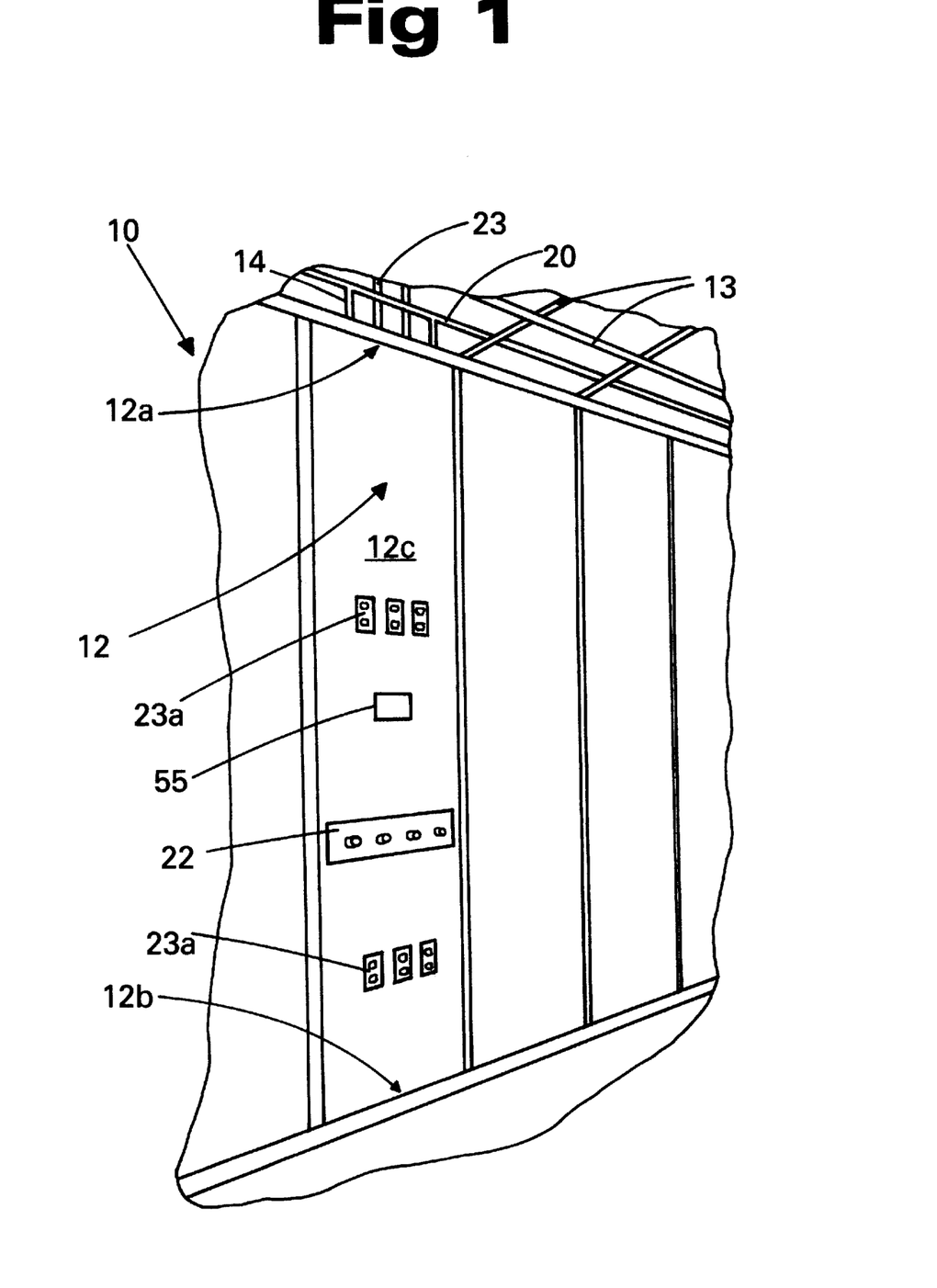
FIG. 1 is a fragmentary perspective view of a modular wall installation.
Figure 2:
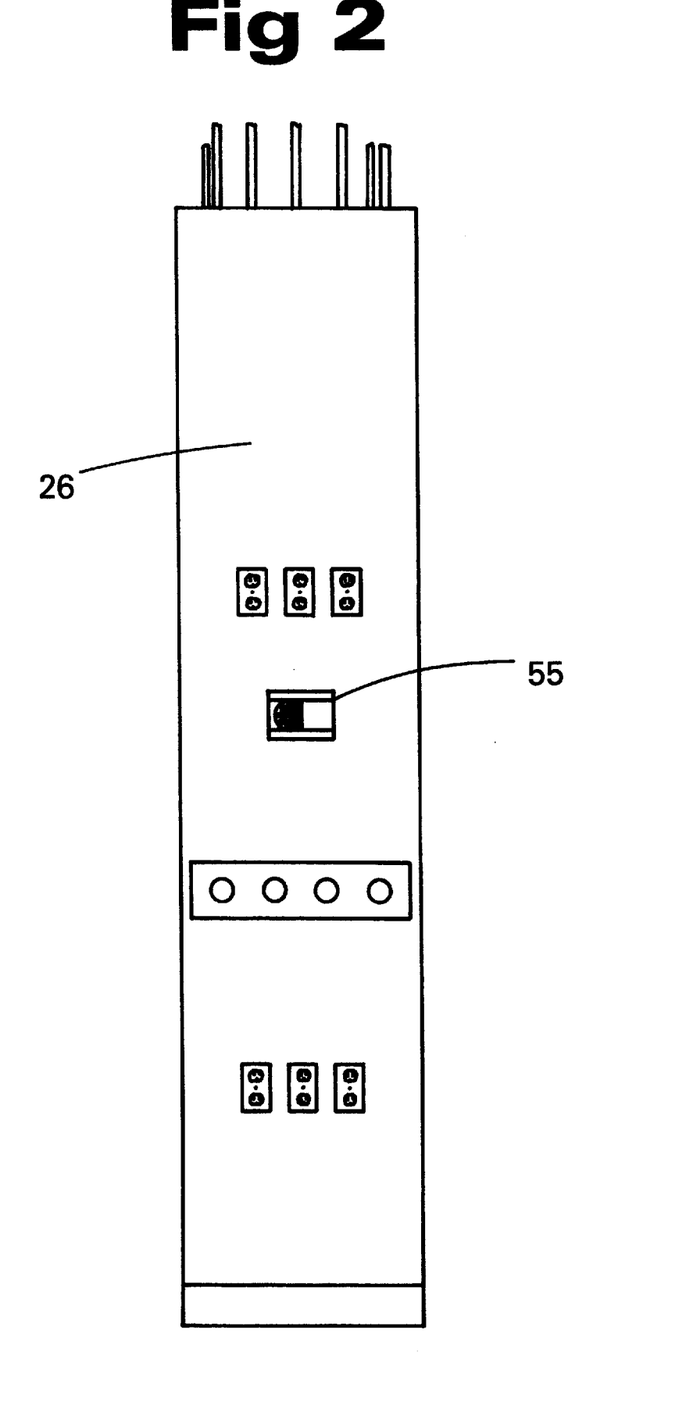
FIG. 2 is a front view of a modular wall panel in the installation of FIG. 1.

Frame means 30 is provided for positioning the side sections and includes a pair of upright frame portions 32, 34 which are arranged to extend in a vertical orientation along opposite longitudinal boundaries of the gap, and a first transverse frame portion 36 which extends across the gap. The wall panel 12 has a first end 12a for positioning adjacent a ceiling, defined for example by a series of ceiling track members 13 as shown in FIG. 1, and a second end 12b for positioning adjacent a floor and the first transverse frame portion is positioned adjacent the first end 12a. The first transverse frame portion 36 is also provided with a plurality of passages 36a therein, each for receiving a corresponding one or more of the conduits 14, 16, 18 as well as electrical conduits 23.

Figure 5:
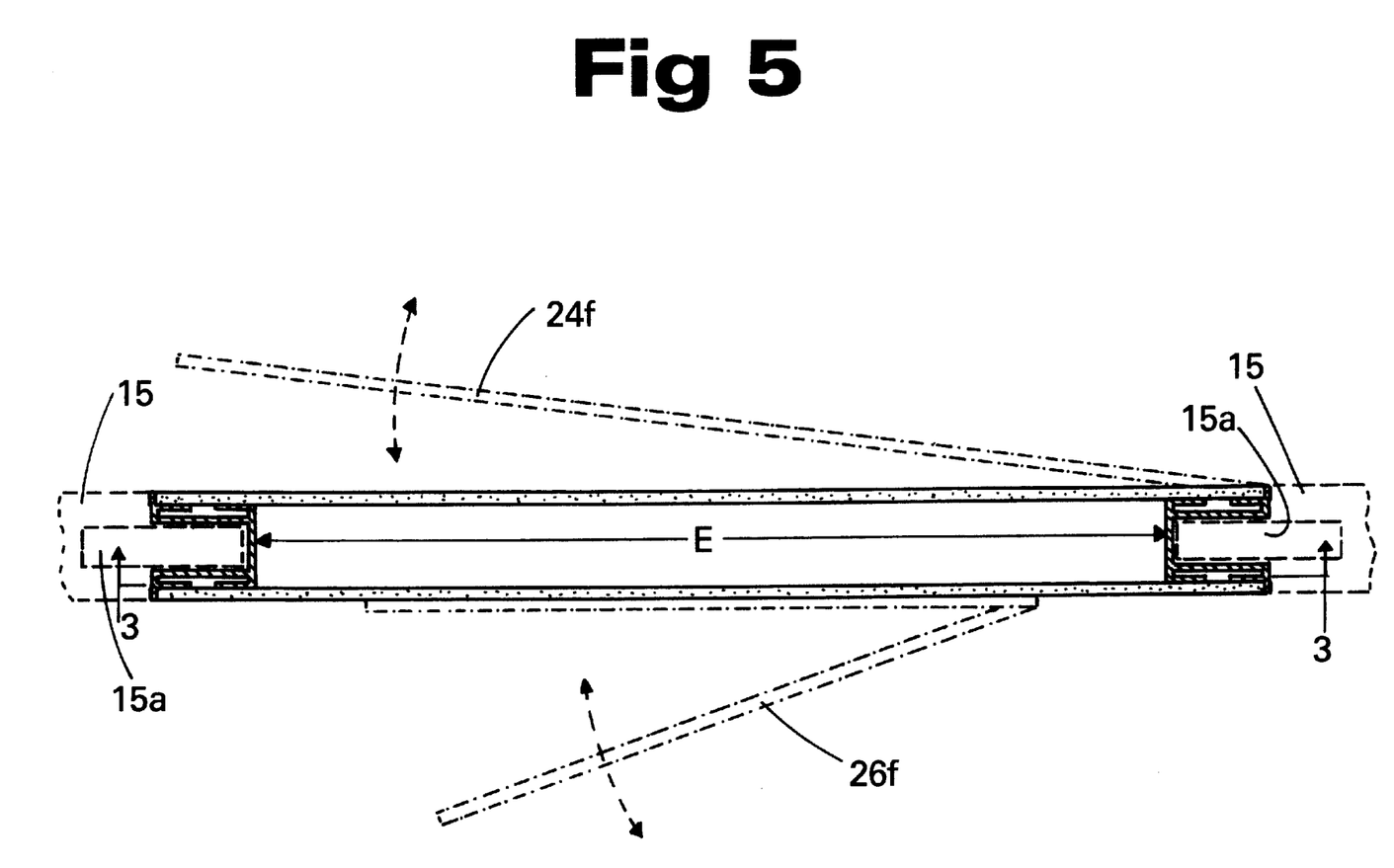
FIG. 5 is a sectional view taken on line 5—5 of FIG. 3.
Figure 6:
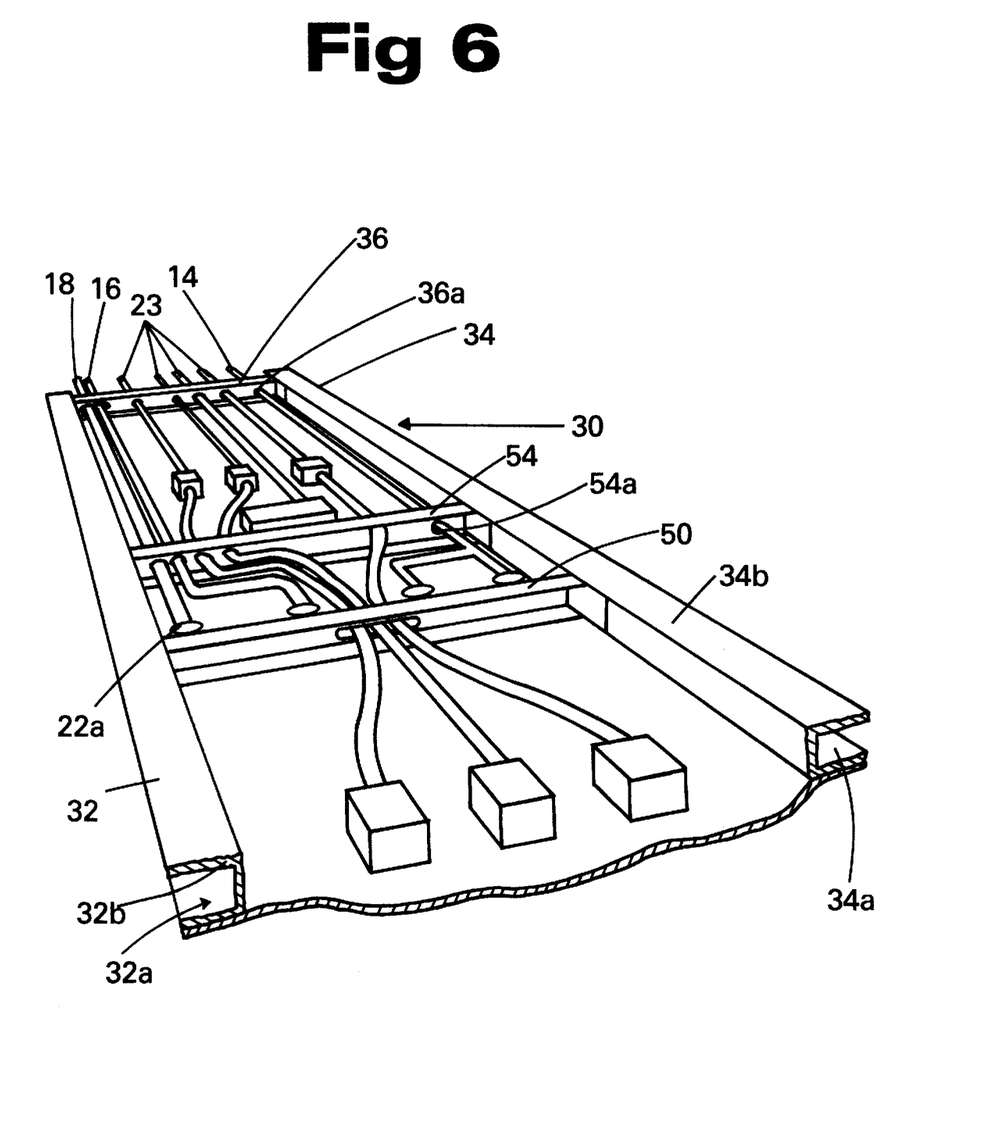
FIG. 6 is a fragmentary view of the wall panel shown in FIG. 2.

Referring to FIG. 4, each of the upright frame portions 32, 34 further includes a longitudinal passage 32a, 34a facing laterally outwardly from the wall panel 12 and extending substantially the full length thereof, so that the panel can be installed with other panels (by use of internal spacers such as shown in phantom at 15 and 15a in FIG. 5) while providing additional space saving benefits as will be described.

The upright frame portions 32, 34 include a pair of spaced flanges 32b, 34b with the longitudinal passage formed therebetween. Each of these flanges engages a corresponding side section 24, 26 by providing a convenient mounting point for each of the side sections. The upright frame portions are conveniently formed as an aluminum extruded section, allowing for the ability to provide certain attachment features (as will be described) and to reduce their weight by providing each of the flanges with an inner passage 32c bordered by a pair of webs 32d which themselves provide a bonding surface for attachment to the side section. The upright frame portions may, however, be formed of other materials if desired, such as plastics and other metals, providing that the upright frame sections have sufficient strength to form a relatively stiff panel to withstand the forces imposed on it over its normal operating life.

Figure 4A:
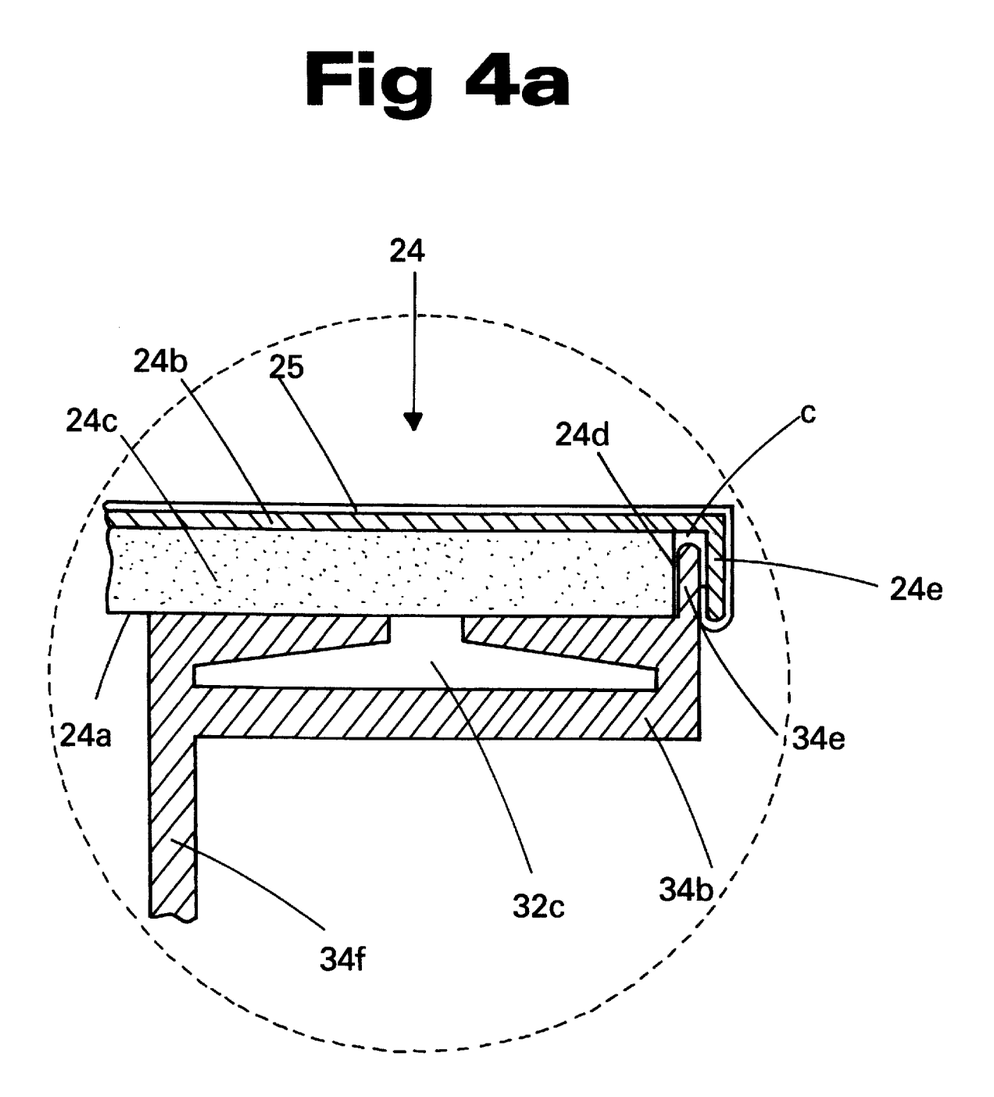
FIG. 4a is a magnified fragmentary sectional view of a portion of the wall panel illustrated in FIG. 4.

As shown in FIGS. 4 and 4a, each of the side sections 24, 26 includes an outer skin layer 24b, 26b and an inner layer 24c, 26c attached, for example by bonding thereto. The outer skin layer is made from metal or plastic materials, preferably a steel material, such as 26 gauge (5 mm) sheet steel. A wall covering 25 is bonded to the outer face of the outer skin layer for decorative purposes and may be a vinyl, paper or other material based wall covering such as wall paper. The inner layer is preferably a gypsum material and has a pair of longitudinal edge regions 24d, 26d and the outer skin layer has a pair of end flanges 24e, 26e adjacent a corresponding one of the upright frame portions, with each of the end flanges being adjacent a corresponding edge region.

It will be seen that each of the end flanges extends towards the corresponding frame portion and the edge region of each of the inner layers is spaced from the adjacent end flange to form a cavity 'c' therebetween. Each upright frame portion 32b, 34b also has a longitudinal flange 32e, 34e which extends into a corresponding cavity 'c'. This provides for a positive engagement of the upright frame portions with each side section as well as an ability to align the upright frame sections with each side section. This also allows the lateral edges of the wall covering 25 to be tucked into the space between each longitudinal flange and its corresponding cavity 'c' and held therein by a friction fit, bonding adhesives or the like, to present a clean appearance and a rugged finish. It will be seen in FIGS. 4 and 4a that the each of the flanges 34e extends in a direction generally perpendicular to the corresponding side section.

As mentioned earlier, the use of the upright frame portions allows the panel 12 to present much the same gap 32a, 32b as is presented laterally outwardly from a conventional modular wall panel, such as that available under the tradename HERMANN MILLAR. At the same time, however, the upright frame portions provide for a significantly larger gap 28 to accommodate both the conduits 14, 16, 18 as well as the electrical cables 23. This can be important in some cases because, for some building code requirements, these conduits can only be used if they are a minimum size (such as ¾ inch and ½ inch) extend in a substantially parallel fashion through the majority of the length of the wall panel member and have solidly constructed elbows to align the conduits to their valve bodies, as will be described.

The spaced flanges 32b 34b are joined together by a web portion 32f, 34f. As can be seen by FIG. 4, the thickness of the web portion is minimal in comparison with the length of the passage. In effect, the spaced flanges together with the web portion arrangement enables the panel 12 to present a longitudinal cavity along the length of the longitudinal edges of the panel with a sufficient depth 'D' to receive the internal spacers 15, so that it can be installed in the modular wall installation 10. At the same time, the length 'E' of the gap in the panel is essentially the spacing between the adjacent inner spacers less the thickness of the two web portions, thereby maximizing the length of the gap to accommodate the medical gas conduit, the valves along with a sufficient spacing therebetween. In other words, the space between the internal spacers is substantially open and not occupied by bulky spacers holding the side sections together and reducing the useful length of the gap. Furthermore, the spaced flanges and the corresponding web portion presents a 'U' shaped cross section, as does the first and second transverse frame members 36 and 50 which together with the bonding of the side sections therewith provides a resulting wall panel with a rigidity comparable with that of conventional wall panels. The metal skin layer bonded with the inner layer provides a side section with a considerable strength which enables the combined thickness to be significantly reduced, thereby increasing the useful width of the gap still further. Thus, the gap is larger both in length and in width to provide the space necessary for the conduits in the manner described.

Each valve body 22*a* is joined to a corresponding one of the conduits and each valve body is provided for controlling the flow of gases through the conduit and each valve body has an actuation means for actuating the valve and accessible from outside the wall panel as well as an outlet outside the wall panel for delivery of gas thereto. A typical valve means would include a number of valve bodies such as those available from VITAL AIRE and will not, per se, be discussed further for the sake of brevity. Each of conduits has an opening which extends beyond the first end, so as to extend though the ceiling for attachment to at least one corresponding medical gas supply line therein.

A second transverse frame portion 50 is spaced from the first transverse frame portion and is conveniently positioned adjacent, in this case below, the valve bodies 22*a* for supporting the valve bodies and the conduit. In this manner, the second transverse frame portion 50 bears substantially the entire weight of the valve bodies and the conduits, without the need for other weight bearing attachment of these to the side sections themselves. Instead, the attachments may be used merely to position the valve body relative to the outer face of the wall panel. If desired, the second transverse member may be above the valve bodies or on both sides thereof and fixed in position therewith.

A third transverse frame portion 54 is positioned between the first and second transverse frame portions 36 and 50 and also includes a plurality of passages 54*a* therein, each for receiving a corresponding one or more of the conduits.

Figure 4B:
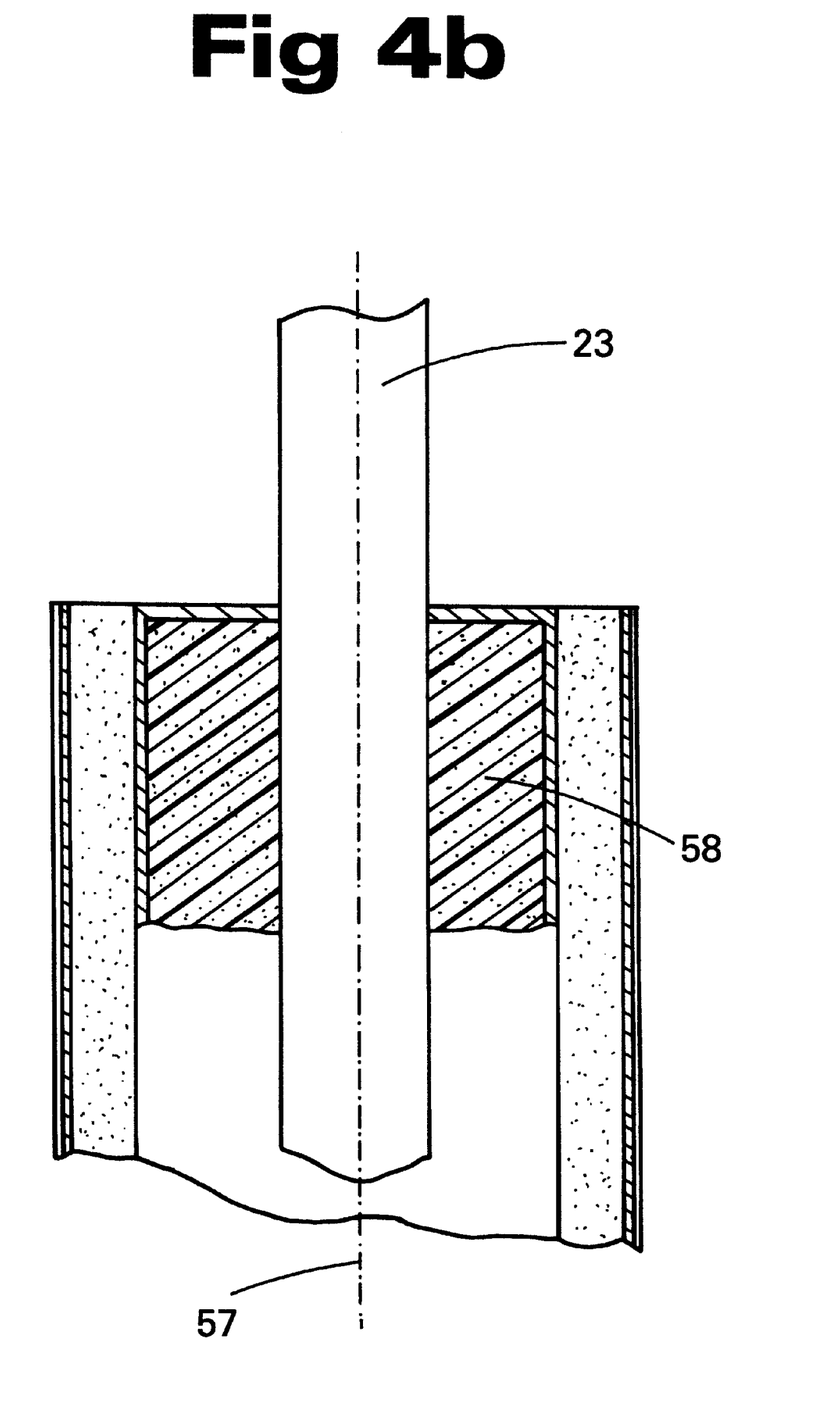
FIG. 4b is a sectional view taken on line 4b—4b of FIG. 4.

Referring to FIG. 4*b*, the first and third transverse members may also be used to contain a layer of foam material 58 which may, for example, be applied thereto during the installation of the conduits and prior to bonding of the final side section to the frame means. The foam material thus allows a convenient method of fixing the conduits in position relative to the first transverse member. In other words, the foam can be used to minimize any transverse and vertical movements of each conduit relative to the first transverse member, as might occur due to vibrations through the supply lines or the structural members of the building. In this particular case, downward vertical displacement of the conduit through the first transverse frame member is inhibited by the abutment of the valve bodies with the second transverse frame member.

If desired, one or more of the side sections may be made removable to allow access to the cavity either to repair the equipment in the cavity or to install or update other equipment therein. This may be done, for example, by providing a hinged connection between one or more of the side sections, such as shown at 24*f* in FIG. 5 or by providing one or supplementary hinged panels on one or both of the side sections, such as for example shown at 26*f*, to allow access through an opening in the panel 26.

The wall panel as described herein may be constructed in the following manner. First, the frame means is assembled as described and one side section is prepared with passages formed in the appropriate locations to accommodate the electrical boxes, the valve outlets and other accessories such as call stations, an example of which is shown at 55, and finally with a wall covering which may be provided with a protective cover to protect its finish during manufacture. The so-prepared side section is installed on an appropriate side of the assembled frame means by aligning the formations 32*e*, 34*e* with the corresponding cavities 'c' while tucking in the lateral edges of the wall covering as above discussed. Having installed one side section to the frame means, the conduits are then installed by feeding them through the respective passages of the transverse members.

The lay-out of the conduits for the wall panel 12 is shown in FIG. 3 where the conduits 14, 16 and 18 each have substantially parallel first portions and which end at an elbow portion which is in turn connected to a lower parallel portion and ending at the valve body. Similarly, the electrical conduits 23 have parallel portions extending either to an upper number of junction boxes or to the call station and then extend to a lower number of junction boxes. If the wall panel 12 has junction boxes and valve outlets on both sides thereof, then those for each side are installed at this stage. It will be seen that the junction boxes are spaced from one another and this spacing may range, for example, between 1 and 4 inches. The second side section may then be installed as described. The wall panel is then ready for installation and has the appearance of a finished wall panel with the junction boxes, call station and valve outlets on one or more faces thereof and with a first end with a number of conduits extending upwardly therefrom, as can be seen in FIG. 4*b*. The conduits in this case are substantially centred relative to the outer faces of the panel, although they can if desired be to one side of the central axis of the wall panel as shown at 57 in FIG. 4*b*, should this aid in the installation. In this manner,the conduits emerge from the area of the panel which is concealed by the union of the wall panel and the ceiling. No additional cover plates are necessary to conceal the conduits, thereby providing a clean appearance. The provision of the conduits and their associated valve bodies do not substantially interfere with the inner working space of the room since the majority of the components, that is apart from the outlet necessary to couple the medical instruments therewith, are within the outer faces of the panel as installed.

Thus, the modular wall installation 10 provides a modular wall panel 12 which is arranged to provide one or more medical gas conduits and/or other equipment for particular use in the finished room, in such a manner that the equipment can be fully assembled if desired prior to the modular wall panel being installed, that is other than the hook up of the conduits with the appropriate gas supplies at the ceiling and the electrical connections if applicable. This eliminates the need for the equipment to be manually installed after the panel is installed, thereby saving time. Further more, the wall panel can be removed from one site, the connections uncoupled and the wall panel reinstalled in another site in a manner that keeps the equipment in the wall panel largely intact and functional once the connections with the gas and electrical supplies are coupled once again. This presents the advantage that quality control can be improved by ensuring that the preparation of the medical gas conduit and the other equipment is made in the controlled environment of a wall panel manufacturing facility rather than in what can potentially be a dirty, dark and uncontrolled environment.

While the above panel includes at least one conduit for use in a medical facility, other applications are contemplated for the modular wall panel not only for the medical facility but also in other facilities such as computer facilities and the like, which can make use of the cavity located between the opposed side sections and the frame portions. For example, the panel may be useful to house hardware other than a medical gas conduit, such as computer equipment, electrical and water utilities where there is need for a relatively large cavity or gap in relation to the external dimensions of the panel. This may be useful where one or more removable panels are provided for access to the cavity. The panel may also be arranged with the one or more conduits extending through the bottom edge region thereof for coupling to supplies beneath the floor rather than at the ceiling as described above.

While the above device shows one example of a modular wall panel, it will be understood that other wall panel configurations may be used. The benefits of the increased width of the gap may in some cases be provided by the opposed longitudinal frame portions, while in other cases, the strength and clean presentation of the side wall section may be used with other means of holding the opposed side wall sections together. Of course, a number of different materials may be used for the various components of the wall panels, such as wood, plastic, metal and the like, while bearing in mind the requirements of the building codes applicable to the installation site in question.

We claim:

1. A modular wall panel for installation in a medical facility, comprising a pair of side sections separated by a gap, each of said section having an inner surface facing said gap, at least one medical gas conduit located in said gap and spaced from each of said inner surfaces, a pair of upright frame portions extending vertically along opposite longitudinal boundaries of said gap, at least a first transverse frame portion extending across said gap, each of said side sections including an outer skin layer and an inner layer attached thereto, said inner layer having a pair of longitudinal edge regions, said outer skin layer having a pair of end frames, each of which is spaced from a corresponding edge region to form a cavity there between, each upright flange portion having a longitudinal flange which extends into a corresponding cavity.

2. A panel as defined in claim 1 said outer skin layer is made from metal or plastic materials, said inner layer is made from a gypsum material.

3. A panel as defined in claim 1 wherein each of said longitudinal flanges extends in a direction generally perpendicular to said side section.

4. A panel as defined in claim 3, wherein said outer skin layer has an outer surface, further comprising a wall covering material located on said outer surface.

5. A panel as defined in claim 4, wherein said wall covering is tucked within each of said cavities.

6. A panel as defined in claim 1 wherein each side section has a first end for positioning adjacent a ceiling and a second end for positioning adjacent a floor, said first transverse frame portion being positioned adjacent said first end, said first transverse frame portion having a passage therein to receive said conduit.

7. A panel as defined in claim 6 wherein a plurality of conduits extend through said gap, each of, said conduits having an opening which extends beyond said first end, so as to extend through said ceiling for attachment to at least one corresponding medical gas supply line therein, wherein said first transverse frame portion has a plurality of passages therein, each receiving a corresponding one of said conduits.

8. A panel as defined in claim 7 further comprising a valve means for controlling a flow of gases through said conduit, said valve means further comprising actuation means for actuating said valve and accessible from outside said panel, an opening outside said panel for delivery of gas thereto, and a valve body joined to said conduit, further comprising a second transverse frame portion spaced from said first transverse frame portion and positioned adjacent said valve means for supporting said valve means.

9. A panel as defined in claim 8 wherein each of said upright frame portions further includes a longitudinal passage racing laterally outwardly therefrom.

10. A panel as defined in claim 9 wherein said upright frame portions include a pair of spaced flanges with said longitudinal passage formed therebetween, each of said flanges engaging a corresponding side section.

11. A modular wall installation, comprising a plurality of modular wall panels, each of said panels having pair of opposed outer faces arranged to extend from a point adjacent a ceiling to a point adjacent a floor, at least one of said panels further comprising at least one conduit extending there through and confined between said outer faces, said at least one panel further comprising a pair of side sections separated by a gap, each of said side sections having an inner surface facing said gap, said at least one conduit being located in said gap and spaced from each of said inner surfaces, a pair of upright frame portions extending vertically along opposite longitudinal boundaries of said gap, at least one transverse frame portion extending across said gap, each of said side sections including an outer skin layer and an inner layer attached thereto, said inner layer having a pair of longitudinal edge regions, said outer skin layer having a pair of end flanges, each of which is spaced from a corresponding longitudinal edge region, to form a cavity therebetween, each of said upright frame portions having a longitudinal flange, wherein a corresponding longitudinal flange on said upright frame member extends into said cavity.

12. An installation as defined in claim 11, wherein said given panel further comprises access means positioned on one of said outer faces for accessing said conduit for transferring fluids therebetween.

13. An installation as defined in claim 12 wherein said given panel has an upper edge region to be positioned adjacent said ceiling, wherein said conduit extends outwardly from said upper edge region.

14. An installation as defined in claim 13 wherein said given panel includes a frame means to support each of said side sections, at least one of said side sections being removable therefrom to expose said conduit therein.

15. An installation as defined in claim 14, wherein the installation has a pair of opposite wall faces, the opposed outer faces of said at least one panel being substantially coplanar with said opposite wall faces.

* * * * *